United States Patent
Schonleitner et al.

(10) Patent No.: US 7,365,996 B2
(45) Date of Patent: Apr. 29, 2008

(54) SWITCHED-MODE POWER SUPPLY

(75) Inventors: Arnold Schonleitner, Vienna (AT); Hallak Jalal Abdulazim, Vienna (AT)

(73) Assignee: Siemens AG Osterreich, Vienna (AT)

( * ) Notice: Subject to any disclaimer, the term of this patent is extended or adjusted under 35 U.S.C. 154(b) by 0 days.

(21) Appl. No.: 11/344,615

(22) Filed: Feb. 1, 2006

(65) Prior Publication Data
US 2006/0215423 A1   Sep. 28, 2006

(30) Foreign Application Priority Data
Aug. 6, 2003 (AT) .............................. A1245/2003
Feb. 6, 2005 (AT) ................ PCT/AT2004/000278

(51) Int. Cl.
*H02M 3/335* (2006.01)
*G05F 1/40* (2006.01)

(52) U.S. Cl. .................. 363/20; 363/21.01; 363/21.12

(58) Field of Classification Search .................. 363/16, 363/20, 21.01, 21.04, 21.12, 95, 97, 131
See application file for complete search history.

(56) References Cited

U.S. PATENT DOCUMENTS

| | | | |
|---|---|---|---|
| 5,014,178 A * | 5/1991 | Balakrishnan | 363/49 |
| 5,206,800 A * | 4/1993 | Smith | 363/21.14 |
| 5,285,369 A | 2/1994 | Balakrishnan | |
| 5,459,652 A | 10/1995 | Faulk | |
| 5,515,257 A * | 5/1996 | Ishii | 363/21.1 |
| 5,841,641 A | 11/1998 | Faulk | |
| 6,396,719 B2 * | 5/2002 | Morita et al. | 363/21.12 |
| 6,690,586 B2 * | 2/2004 | Hosotani et al. | 363/19 |
| 7,130,204 B2 * | 10/2006 | Tsuruya | 363/56.12 |
| 2003/0156365 A1 | 8/2003 | Kranister et al. | |
| 2005/0029952 A1 | 2/2005 | Schweigert et al. | |
| 2005/0168189 A1 | 8/2005 | Schweigert | |
| 2005/0190515 A1 | 9/2005 | Hallak et al. | |
| 2005/0190517 A1 | 9/2005 | Schweigert et al. | |

OTHER PUBLICATIONS

International Search Report, PCT/AT2004/000278 dated Nov. 2, 2004, (4 pages).
Written Opinion, PCT/AT2004/000278 dated Nov. 2, 2004 (3 pages) (Translation- 2 pages).
Basso, C. "Transistor Pair Lowers PWM IC's Start-Up Current", EDN Electrical Design News, Cahners Publishing Co., Newton, Massachusetts, vol. 44, No. 6, (1 page) (Mar. 18, 1999).

* cited by examiner

*Primary Examiner*—Matthew V. Nguyen
(74) *Attorney, Agent, or Firm*—Anton P Ness; Fox Rothschild LLP

(57) ABSTRACT

A switched-mode power supply for converting a DC input voltage (Uzk) into an output voltage (Ua). The switched-mode power supply comprises a circuit (AST) for triggering at least one controlled switch (S) that periodically applies the input voltage to at least one primary winding (Wp) of a transformer (UET). An auxiliary voltage for the triggering circuit can be switched off with the aid of an auxiliary semiconductor switch (Ts) when the input voltage drops below a given minimum value, the auxiliary voltage consisting of a first auxiliary supply voltage (Uh) diverted from the input voltage and a second auxiliary supply voltage (Uhl) diverted from a secondary winding (Wh) of the transformer by means of rectification. The control electrode (G) of the auxiliary switch (Ts) is connected to both a reference voltage output (R) of a reference voltage (Uref) that is internally generated in the triggering circuit (AST) and a divider point (Te) of an input voltage divider (Rs1, R1,R2) such that the control electrode (G) of the auxiliary switch (Ts) receives an additional voltage during operation of the triggering circuit so as to turn on the auxiliary switch (Ts).

6 Claims, 1 Drawing Sheet

SWITCHED-MODE POWER SUPPLY

CROSS-REFERENCE TO RELATED APPLICATIONS

The present application claims priority from PCT Application No. PCT/AT2004/000278 filed Feb. 6, 2005 which in turn claims priority from Austrian Patent Application A 1245/2003 filed Aug. 6, 2003.

FIELD OF THE INVENTION

The invention relates to electrical circuits and more particularly to power supplies.

BACKGROUND OF THE INVENTION

The invention relates to a switched-mode power supply for converting a DC input voltage into an output voltage having a trigger circuit for triggering at least one controlled switch that periodically applies the input voltage to at least one primary winding of a transformer, it being possible to switch off an auxiliary voltage for the trigger circuit using an auxiliary semiconductor switch when the input voltage drops below a given minimum value, the auxiliary voltage being, on the one hand, a first auxiliary supply voltage derived from the input voltage and, on the other hand, a second auxiliary supply voltage derived from an auxiliary winding of the transformer via rectification.

In switched-mode power supplies of the standard type, the trigger circuit draws the auxiliary supply voltage required for its operation first during startup from an auxiliary voltage capacitor as the first auxiliary supply source situated above a high-resistance current path from the input voltage, in part during the ramp-up but after that from an auxiliary winding of the transformer after rectification and regulation via an in-phase regulator as a second auxiliary power supply. A constant voltage supply of the trigger circuit via the input voltage, which is usually attained via rectification of an AC supply voltage and often is called a link circuit voltage, would cause undesirable losses in the series resistance because the input voltage may be as much as 370 volts or more, but the supply voltage of the trigger circuit is only 15 volts, for example, so the voltage difference must be across the series resistor, and even at only low current consumption of the trigger circuit of, e.g., 10 mA, the power to be dissipated would be a few watts.

The starting point of the problem on which the present invention is based is that in lowering the DC supply voltage below a given value, e.g. 100 volts, the voltage supply of the trigger circuit must be interrupted in order for the switched-mode power supply to be shut down. Otherwise, proper operation would not be possible; the limits of the pulse duty factor of the trigger pulse for the switch, excessive current etc. would be encountered. Furthermore, the aforementioned threshold voltage value at which the circuit is to be switched off or switched back on must be subject to hysteresis; otherwise, instabilities would result.

The switching of a switched-mode power supply according to the prior art, in which the aforementioned switching off or switching back on of the supply voltage of the trigger circuit is possible, is shown in FIG. 1. A DC supply voltage Uzk, which was acquired, for example, via rectification of an AC mains voltage and whose nominal range is between, for example, 120 and 370 volts, can be switched via a controlled switch S to a primary winding Wp of a transformer UET. The connected current in this current flows via a sensor resistor Rsh from which information corresponding to the current is supplied to a trigger circuit AST, which supplies a control pulse to the gate electrode of the controlled switch S. Secondarily, the voltage of a secondary winding Ws of the transformer is rectified using a rectifier diode Dg, filtered at a capacitor Ca and is available as output voltage Ua. The information of a voltage sensor SPS at output voltage Ua is fed via an optocoupler OKO of the trigger circuit AST, so that a regulation of the output voltage via a corresponding change of the pulse duty factor of the trigger pulse for switch S is possible. In addition, it is also possible to regulate to a voltage in the primary circuit, as well as to an output current or an input current, these kinds of regulation and their combinations being well known to an expert in the field.

The trigger circuit AST has an input H for its operating voltage, hereinafter referred to as auxiliary supply voltage. This auxiliary supply voltage is attained, as already mentioned, in two different ways. During the startup phase of the trigger circuit or the switched-mode power supply, very generally a voltage is available that is present across an auxiliary voltage capacitor Cs and is attained using a high-resistance current path, in this case a high-resistance series resistor Rs. This voltage is designated here as Uh and it is routed across the breaker gap of an auxiliary semiconductor switch Ts to aforementioned voltage supply input H of trigger circuit AST. During the operation of the power supply, an auxiliary coil Wh supplies a voltage that is rectified using a rectifier diode D and filtered at a capacitor C. This voltage is likewise routed through an in-phase regulator LAE and a decoupling diode De to supply input H of trigger circuit AST.

In order to enable the hysteresis-affected switching off and on of auxiliary switch Ts, which in this case has a base-emitter resistance Rbe, a comparator KOM is provided whose output is routed to the switch input of auxiliary switch Ts, in this case to the base. The positive input of comparator KOM is present at the reference voltage Uref produced by a Zener diode Zref. Zener diode Zref receives its current via a resistor R at which auxiliary supply voltages Uh or Uh1 are present. Therefore a voltage is present on the positive input of comparator KOM that corresponds to the current auxiliary voltage. A voltage is present at the negative input of comparator KOM that is obtained from input voltage Uzk using a voltage divider Ra, Rb. In the positive feedback branch of comparator KOM, a resistor network R41, R42 is provided that determines the hysteresis behavior of comparator KOM.

If, during this switching of the switched-mode power supply, input voltage Uzk drops below a value prescribed by reference diode Zref, e.g. 100 volts, comparator KOM switches off auxiliary switch Ts and along with it the auxiliary supply voltage of trigger circuit AST, which thereupon no longer cycles and the entire switched-mode power supply stops its power supply operation. If supply voltage Uzk thereafter increases again, comparator KOM connects auxiliary switch Ts again, but with an hysteresis of, for example, 20 volts, which then occurs corresponding to the aforementioned exemplary hysteresis at an input voltage of 120 volts. Even though the desired function of the switching-off or switching-back-on part is ensured by this circuit, the relatively high current consumption (power loss) of the needed components is disadvantageous, as is the space required for the components.

One object of the invention is to find a circuit for the controlled switching on and off of the auxiliary supply voltage that has a lower current consumption and is simpler in construction.

BRIEF SUMMARY OF THE INVENTION

This objective is achieved by a switched-mode power supply of the type mentioned at the outset in which according to the invention the gate electrode of the auxiliary switch is connected on the one hand to a reference voltage output of a reference voltage produced internally in the trigger circuit and on the other hand to a divider point of an input voltage divider, so, when the trigger circuit is operative, the gate electrode of the auxiliary switch receives an additional voltage in the sense of a forced tripping of the auxiliary switch.

The circuit according to the invention does not need a comparator, and therefore also does not need the current-zeroing element on the input protective circuit of such a comparator. It is simple and inexpensive in construction, and the power loss can be reduced substantially. In order to prevent reactions to the switching controller, an advantageous embodiment of the invention provides that a decoupling resistor is connected between reference voltage output and gate electrode of the auxiliary switch. In the sense of a free selection of the switch-on/switch-off threshold of the auxiliary switch, it is expedient if the decoupling resistor is situated between reference voltage output and the divider point of a voltage divider.

In order to find the fewest possible switching elements that suffice and still achieve safe function, it is expedient if the input voltage is routed via the series circuit of two resistors to an auxiliary voltage capacitor from which the auxiliary voltage goes across the breaker gap of the auxiliary switch to the auxiliary voltage input of the trigger circuit, and the input voltage divider for the gate electrode of the auxiliary switch is connected to the interconnection point of the two resistors of the series circuit. This takes into consideration the circumstance that high-resistance (power) resistors technically are usually comprised of the series circuit of two or more resistors.

In order to enable a well-defined cut-out of the voltage supply on the in-phase regulator or vice-versa, it is advantageous if the reference voltage on the reference voltage output of the trigger circuit is switched on or switched off if the supply voltage of the trigger circuit falls below or exceeds a threshold value. Therefore, it is advisable if the switching-on or switching-off of the reference voltage is accomplished with hysteresis.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
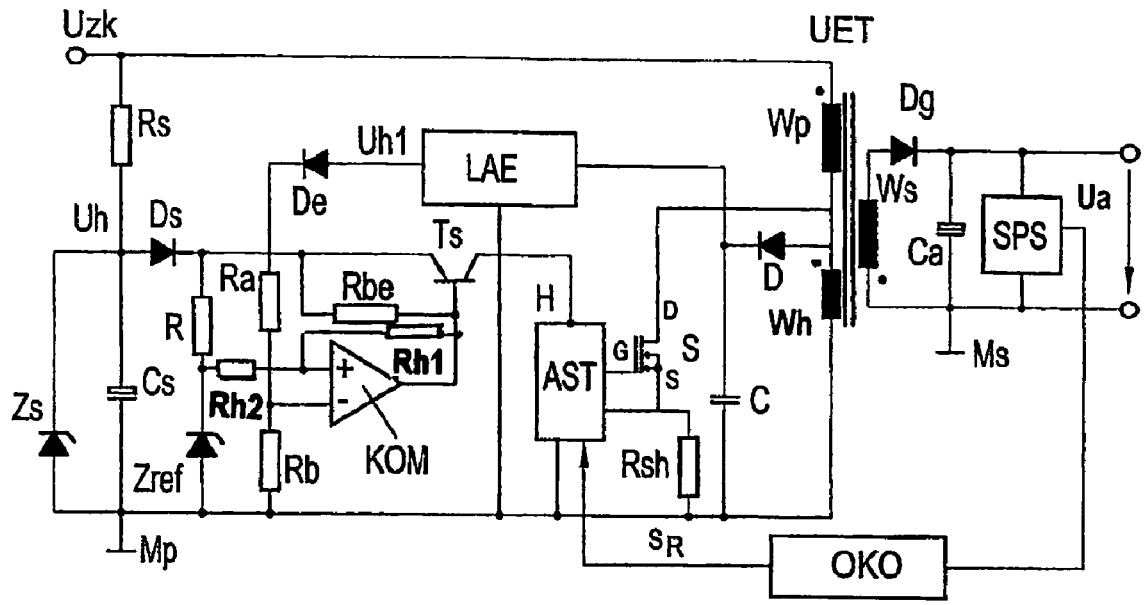
FIG. 1 shows the circuit of a switched-mode power supply according to the prior art already described above.

In the drawings, like numerals indicate like elements throughout. In the drawings, like numerals indicate like elements throughout. Certain terminology is used herein for convenience only and is not to be taken as a limitation on the present invention. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Figure 2:
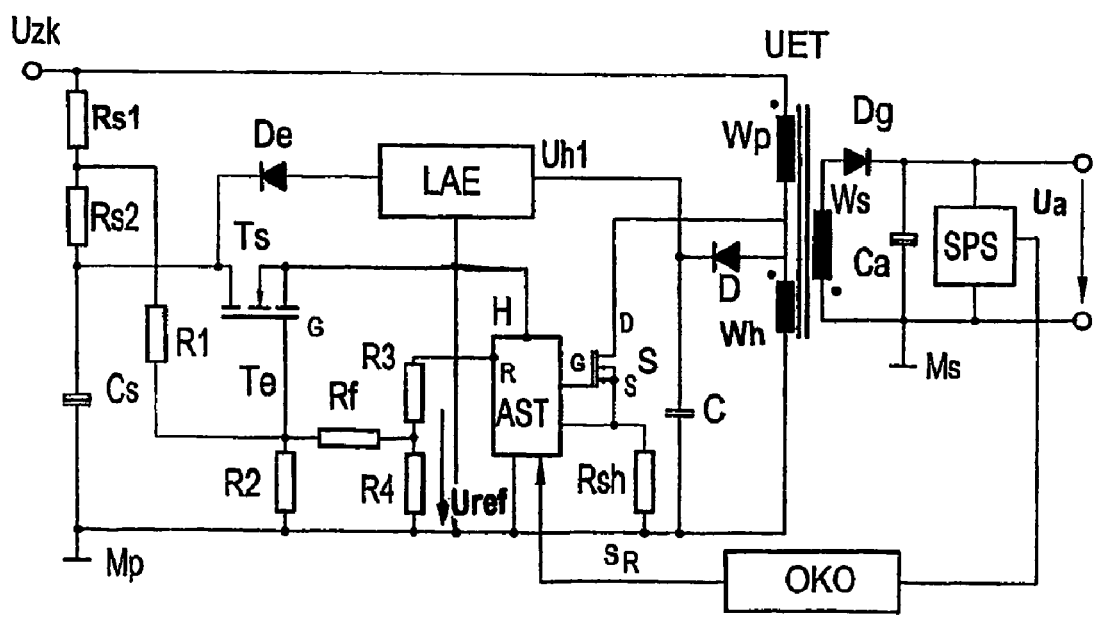
FIG. 2 shows the circuit of a switched-mode power supply according to the present invention.

The circuit according to FIG. 2 corresponds in its essential construction to the one in FIG. 1, which is not difficult to recognize. The triggering of auxiliary switch Ts which is designed in this case as FET, is different from the circuit according to FIG. 1. First, a trigger circuit AST in which a reference voltage Uref is available on a reference output R is a prerequisite for the invention, this reference voltage being switched on or switched off as soon as the supply voltage of the trigger circuit exceeds/falls below a threshold, a hysteresis possibly being present. Commercially available trigger circuits AST all have such a reference voltage, but so far it has not been employed for the purpose described further below. Reference voltage Uref of trigger circuit AST is fed via a decoupling resistance Rf, to the gate electrode, in this case the gate, of auxiliary switch Ts. Even though it is not absolutely necessary, a voltage divider R3, R4 may be provided for the reference voltage Uref, from whose divider point decoupling resistor Rf leads to the gate of auxiliary switch Ts. By selection of resistance ratio R3/R4, a wide dimensioning range is obtained regarding the switching characteristics.

Gate electrode G of auxiliary switch Ts is present at divider point Te of an input voltage divider, which is formed here by a resistor Rs1, a resistor R1 and a resistor R2. Alternatively, resistor R1 could also be switched directly to input voltage Uzk. Another resistor Rs2 connects resistor Rs1 to capacitor CS for auxiliary supply voltage Uh. In the circuit according to FIG. 2, series resistor Rs, which is shown in FIG. 1, is therefore divided into two resistors, Rs1 and Rs2. As in FIG. 1, the primary mass is designated as Mp and the secondary mass is designated as Ms.

The circuit shown in FIG. 2 works as follows: as soon as trigger circuit AST begins to operate, or shortly thereafter, internal reference voltage Uref is present on output R and a corresponding voltage or a portion proportional thereto is applied to branch R2 of voltage divider Rs1, R1, R2, whereupon the voltage in turn is started at gate G of auxiliary switch Ts. Finally, in-phase regulator LAE with its output voltage Uh1 takes over the auxiliary power supply function.

If input voltage Uzk drops, then the voltage across gate G of auxiliary switch Ts drops proportionally and accordingly reduces the voltage at source S by 2 to 3 volts. Starting at a certain voltage at point Te of the input voltage divider, the trigger circuit stops working and the reference voltage Uref collapses at output R. As a result voltage divider point Te is pulled even further into the negative and the switch-off is secured even better. In this way, the required hysteresis concerning the switch-off and switch-on is produced.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A switched-mode power supply for converting a DC input voltage into an output voltage having a trigger circuit for triggering at least one controlled switch that periodically applies the input voltage to at least one primary winding of a transformer, it being possible to switch off an auxiliary voltage for the trigger circuit using an auxiliary semiconductor switch when the input voltage drops below a given minimum value, the auxiliary voltage being, on the one hand, a first auxiliary supply voltage derived from the input voltage and, on the other hand, a second auxiliary supply voltage derived from an auxiliary winding of the transformer via rectification wherein the gate electrode of the auxiliary switch is connected on the one hand with a reference voltage output of a reference voltage produced internally in the trigger circuit and on the other hand with a divider point of an input voltage divider, so when the trigger circuit is operative the gate electrode of the auxiliary switch receives an additional voltage in the sense of a forced tripping of the auxiliary switch.

2. The switched-mode power supply as described in claim 1, wherein a decoupling resistor is connected between the reference voltage output and the gate electrode of the auxiliary switch.

3. The switched-mode power supply as described in claim 2, wherein the decoupling resistor is situated between the reference voltage output and the divider point of a voltage divider.

4. The switched-mode power supply as described in claim 1, wherein the input voltage is routed via a series circuit of two resistors to an auxiliary capacitor from which the auxiliary voltage goes across a breaker gap of the auxiliary switch to the auxiliary voltage input of the trigger circuit and is connected to the interconnection point of the two resistors of the series circuit of the input voltage divider for the gate electrode of the auxiliary switch.

5. The switched-mode power supply as described in claim 1, wherein the reference voltage at the reference voltage output of the trigger circuit is switched on or off if the service voltage of the trigger circuit exceeds or falls below a threshold.

6. The switched-mode power supply as described in claim 5, wherein the switching on or off of the reference voltage occurs with hysteresis.

* * * * *